May 20, 1924.
H. C. LORD
1,494,852
RESILIENT WHEEL
Original Filed Oct. 27, 1919
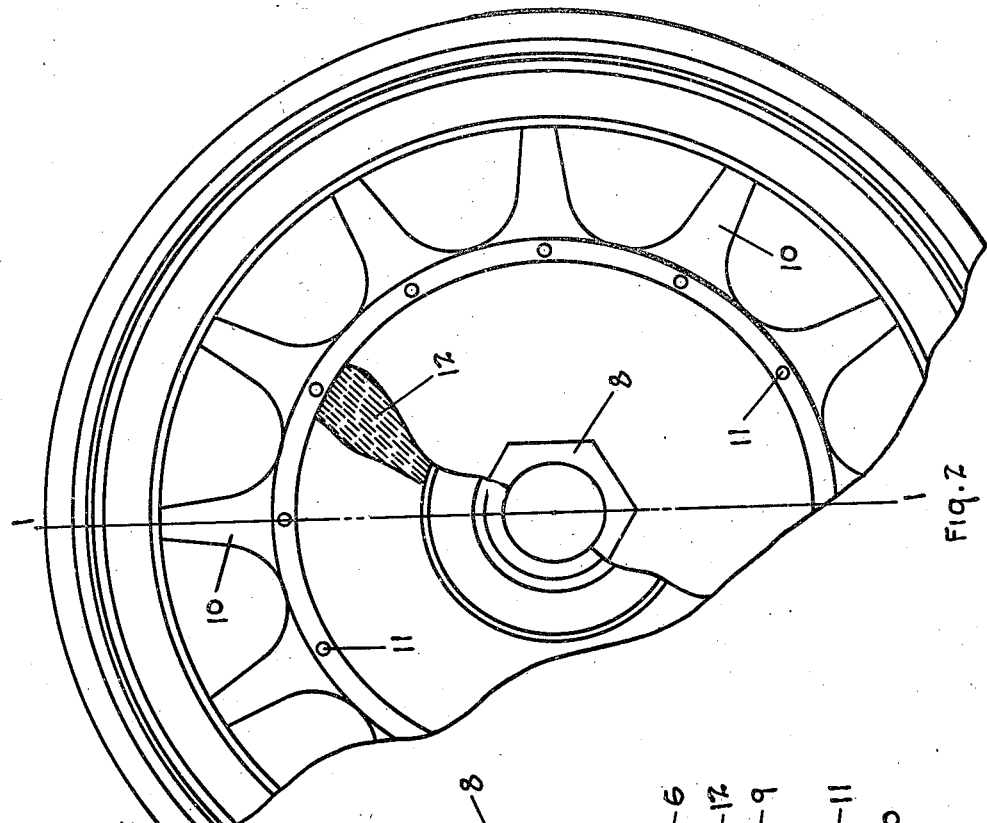
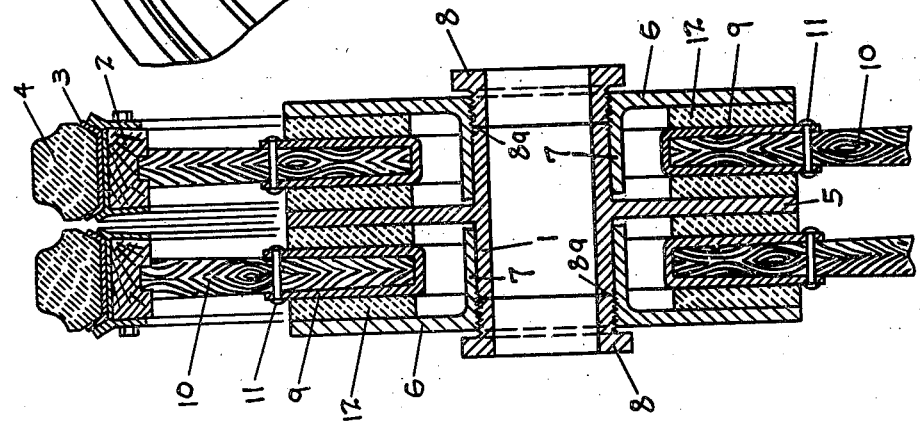
Inventor
Hugh C. Lord Patented May 20, 1924.

1,494,852

UNITED STATES PATENT OFFICE.

HUGH C. LORD, OF ERIE, PENNSYLVANIA.

RESILIENT WHEEL.

Application filed October 27, 1919, Serial No. 333,453. Renewed October 17, 1923.

*To all whom it may concern:*

Be it known that I, HUGH C. LORD, a citizen of the United States, residing at Erie, in the county of Erie and State of Pennsylvania, have invented new and useful Improvements in Resilient Wheels, of which the following is a specification.

The invention is designed to provide a resilient wheel which will to a very large extent absorb the road shocks between the rim of the wheel and the hub.

With heavy vehicles, such as trucks, difficulty has been experienced in sustaining the load and it is common practice to provide the rear wheels which carry the larger part of the load with a plurality of tires or an extremely wide tread. This does not entirely accomplish the purpose because the widening of the tread surface does not usually extend the actual contact surface as the wheel engages the road. The whole load is frequently carried by a very small portion of the tread surface regardless of its width. With the present invention this difficulty is largely overcome.

The invention is illustrated in the accompanying drawings as follows:—

Fig. 1 shows a central vertical cross section of the wheel on the line 1—1 in Fig. 2.

Fig. 2 a side elevation of the wheel, parts being broken away to better show construction.

1 marks the hub. This may be made of any form to adapt it to the bearings with which it is to be used. 2 marks the wheel felloe, 3 the rim and 4 the rubber tire. As shown there are two felloes, two rims and two tires placed adjacent to but disconnected from each other.

The hub is provided with a central radially-extending flange or plate 5 and with the side flanges or plates 6, the side flanges or plates having the central sleeves 7 which are mounted on the hub 1. Annular channels 9 are arranged between the plates 5 and 6, the sides of these channels forming radially extending plates overlapping the plates 5 and 6. Spokes 10 are mounted in the annular channels 9 and are secured to the felloes in the usual manner. Rivets 11 extend through the walls of the channels in the spokes and firmly clamp the spokes in the channels.

Discs of rubber 12 having openings through their center are formed between the overlapping portions of the plates 5 and 6 and the side walls of the channels 9. This rubber is secured to the side walls of the plates in the process of vulcanization. This is accomplished ordinarily by preparing the surfaces usually with a slight copper plating applied by the process usually described as "dipping." The metal surface should be fully cleaned by pickling and washed and the plating provided by dipping, a very slight plating being all that is desirable. The surfaces are ordinarily originally coated with a cement and the rubber placed between the coated surfaces and the whole vulcanized. Preferably the surfaces may be slightly corrugated or roughened to facilitate the securing of the rubber to the metal. There are many processes for securing rubber to metal and the peculiar process by which this is effected forms no part of this invention.

The operation of the device will readily be observed. When the hub is subjected to weight this pressure is communicated to the rim portion through the resilient rubber inserts and these inserts are stretched, the entire cross section of the insert being equally stretched as an incident to pressure in a diametric direction. It will be observed that the weight is in effect carried by an initial straight line relation of the rubber forming a span which line is deflected as the rubber is stretched, the ends of the span being locked against movement toward each other so as to resist the pull of the span. Consequently the cushion has a very mild initial tension which is increased not only by the stretching of the rubber but by the variation of this angular relation of the stretched material with the surface to which it is attached.

It is possible in this structure to increase the cross section of rubber sustaining the load to a very large extent so that very large loads may be easily carried, without undue strain on the rubber. Further the increase in resistance to the relative movement may be varied by varying the thickness of the rubber, the thinner the rubber the more rapidly the increase in resistance takes place. It will be observed also that with this construction a very great relative movement of the head and rim portion is practical.

Under some conditions it may be desirable to place the rubber under initial tension and this may be done by the sleeve nuts 8 which extend into the sleeve 7 and abut against shoulders 8ᵃ on the hub.

In the construction shown the two independent rim portions are carried by the hub. It is obvious that if one of these rim portions engage an obstruction it will yield to this obstruction, the other rim portion assisting in carrying the load up to the limit of the resiliency of the engaged rim portion. Further if the wheel is operating upon an arched pavement or road both rim parts are fully in engagement and assist in carrying the load. In this way the shock and wear on the tires is very much reduced.

What I claim as new is:—

1. In a wheel, the combination of a hub member; a plurality of independent rim members, said members comprising parts overlapping radially; resilient members between said overlapping parts forming a resilient span rigidly secured to the overlapping parts of the rim and hub members; and means on the members locking the ends of the span against axial movement toward each other.

2. In a wheel, the combination of a hub having a centrally extending flange forming a radially extending plate; sliding plates mounted on the hub; means for adjusting the sliding plates; rim members having annular plates overlapping and arranged between the plates extending from the hub; rubber inserts secured to and bridging the space between said plates; and means for adjusting the sliding plates to place the rubber under initial tension.

In testimony whereof I have hereunto set my hand.

HUGH C. LORD.